United States Patent [19]

Magly

[11] Patent Number: 4,948,001
[45] Date of Patent: Aug. 14, 1990

[54] INTERRUPTED THREADS ON A PLASTIC BOTTLE FINISH

[75] Inventor: Earl D. Magly, Crystal Lake, Ill.

[73] Assignee: Continental Can Company, Inc., Norwalk, Conn.

[21] Appl. No.: 423,348

[22] Filed: Oct. 18, 1989

[51] Int. Cl.⁵ .................. B65D 1/02; B65D 23/00; B65D 41/04

[52] U.S. Cl. .................................. 215/31; 215/329; 220/296

[58] Field of Search .................. 215/1 C, 31, 329; 220/296; 428/35.7, 36.92, 542.8

[56] References Cited

U.S. PATENT DOCUMENTS

| | | | |
|---|---|---|---|
| 3,212,663 | 10/1965 | Greenwell | 215/31 |
| 3,392,861 | 7/1968 | Dimmitt et al. | 215/329 X |
| 3,405,831 | 10/1968 | Hudson | 215/31 X |
| 3,840,143 | 10/1974 | Davis et al. | 220/296 X |
| 4,098,419 | 7/1978 | Virog, Jr. et al. | 215/31 X |
| 4,535,906 | 8/1985 | Rowekamp | 215/329 |
| 4,643,330 | 2/1987 | Kennedy | 220/296 X |

FOREIGN PATENT DOCUMENTS 225924 12/1924 United Kingdom ............... 215/329

Primary Examiner—Sue A. Weaver
Attorney, Agent, or Firm—Charles E. Brown; Paul Shapiro; Charles A. Brown

[57] ABSTRACT

This relates to a container having a neck finish which is provided with threads for receiving a closure and wherein the threads are blow molded in the formation of the container from a tubular parison. It has been found that in the blow molding of the threads, there is a thinning of the wall of the neck finish at the roots of the threads and under certain circumstances, when a closure is applied at a high torque, there is an axial collapse of the neck finish rendering the container unfit for use. The problem of axial collapse of the neck finish is overcome by interrupting the threads so as to provide axial beam strength at circumferential intervals around the neck finish.

10 Claims, 1 Drawing Sheet

INTERRUPTED THREADS ON A PLASTIC BOTTLE FINISH

This invention relates in general to new and useful improvements in the threaded neck finish of a plastic container wherein the container, including the neck finish, is blow molded from an elongated tube or parison, and more particularly to the interruption of such threads so as to provide axial beam strength in the neck finish for preventing collapsing of the neck finish when a closure is applied This invention relates most specifically to containers of the type having thin wall neck finishes and specifically relates to the solving of the problem of the neck finish collapsing when a closure is applied.

The container construction and the neck finish causes inherent thin spots at the roots of the threads which are blow molded This occurs primarily at 90° from the customary parting lines.

In accordance with this invention, it has been found that if the thread or threads are interrupted in this area of undue thinness, the non blown portion of the neck finish will function as an axial beam so as to prevent the collapse of the neck finish under high torques.

Most particularly, container neck finishes which have collapsed and are totally functionless upon the application of a closure at a 28# torque, when the threads are interrupted generally 90° away from the parting lines, the same closure may be applied at a torque of 30# and above.

With the above and other objects in view that will hereinafter appear, the nature of the invention will be more clearly understood by reference to the following detailed description, the appended claims, and the several views illustrated in the accompanying drawings.

Figure 2:
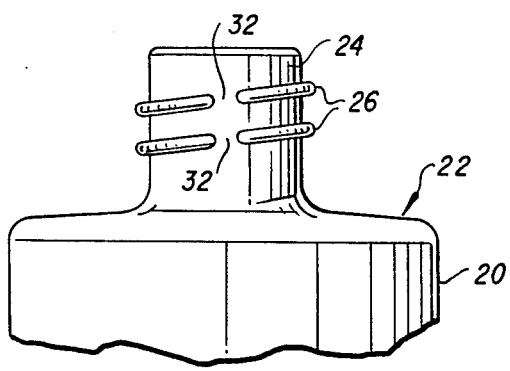
FIG. 2 is a fragmentary elevational view of the upper portion only of the container of FIG. 1 and shows more specifically the interruptions of the threads.
Figure 3:
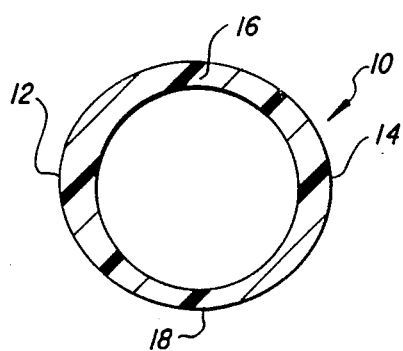
FIG. 3 is an enlarged transverse sectional view taken through a parison showing the non uniform wall thickness thereof.

This invention specifically relates to the formation of containers by blow molding utilizing a tubular parison. The containers per se do not require structural strength of any great value and normally will be generally rectangular or oval in transverse cross section. In order to provide for a uniform wall thickness of such containers, there is provided a tubular parison 10 which is illustrated in FIG. 3. The tubular parison 10, as opposed to having a uniform wall thickness about its circumference, in view of the fact that the parison must be expanded more in the direction of a container in a body elongation, has a varying wall thickness. The parison 10 has a maximum wall thickness at diametrically opposite points 12, 14 and minimal wall thickness generally 90° from the points 12, 14 as at 16, 18. While this varying thickness of the parison wall compensates for the non circular cross section of the container body such as the container body 20 of FIGS. 1 and 2, inasmuch as the resultant container 22 of necessity to receive a closure, has a circular neck finish 24, it will be seen that the neck finish 24 will have thick and thin portions in accordance with the cross section of the parison 10.

Figure 4:
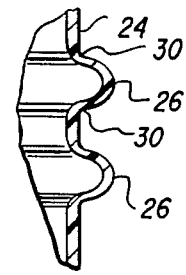
FIG. 4 is an enlarged fragmentary sectional view taken through the neck finish of a conventional container without interrupted threads at a position 90° from the parting lines and shows the undue thinning of the threads at the roots thereof.

The neck finish 24 is provided with integral threads 26 which are blow molded in a customary manner so as to be generally hollow. As a result, as is best shown in FIG. 4, there is a concentrated stretching of the material of the neck finish 24 to form the threads 26. The net result is that when the parison 10 is of the proper minimal wall thickness, in the areas 90° from mold parting lines 28 shown in FIG. 1, the threads 26 are unduly thinned at their roots 30.

Thus when a closure (not shown) is applied to the prior art neck finish 24, the neck finish will not withstand sufficient pressure, but will collapse at the roots of the threads 26.

In accordance with this invention, it is proposed to provide the neck finish 24 with axial beam strength spaced generally 90° from the parting lines 28. This is accomplished by interrupting the threads 26 as at 32. Since the material of the neck finish 24 is not thinned in the area 32, the neck finish 24 remains of its original blow molded strength and thus defines an axial beam.

The neck finish thus is provided with a pair of diagonally aligned, axial beams 34 in the area of thread interruption 32. Further, because the parison from which the neck finish 24 is formed is a greater thickness as at 12 and 14 in alignment with the parting lines 28, the neck finish 24 including the threads 26 are of a greater thickness at the parting lines 28 and thus second axial beams, identified by the numeral 36, occur in alignment with the parting lines 28.

Thus the neck finish 24, being provided with four axial beams spaced on the order of 90° apart can withstand a much higher torque application of a closure without the collapse of the neck finish 24.

It is to be understood that when the neck finish is formed from the parison 10 having areas of maximum wall thickness at 12 and 14 and areas of minimal wall thickness at 16 and 18, the collapse problem of the neck finish may be solved by having the interruptions 32 generally 90° from the parting lines 28. On the other hand, collapsing of the neck finish can also occur when the neck finish, identified by the numeral 40, is of a uniform, but unduly thin, wall thickness. In other words, in the neck finish 40, there may be no axial beam strength in alignment with parting lines 42 thereof. Therefore, in the case of the neck finish 40, threads 44 thereof may be interrupted not only at 46, 90° from the parting lines 42, but also generally in alignment with the parting lines 42. This is clearly shown in FIG. 5.

Figure 1:
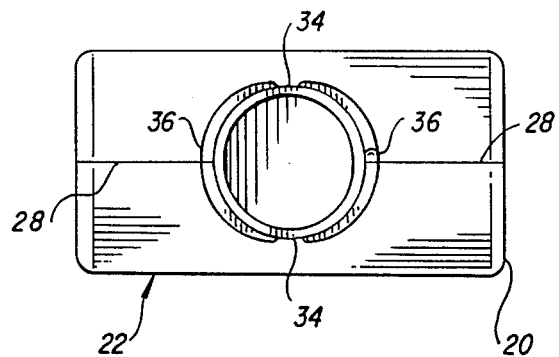
FIG. 1 is a top plan view of a typical container having a neck finish formed in accordance with this invention.
Figure 5:
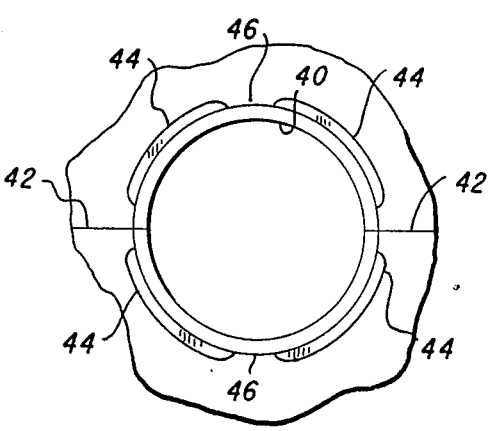
FIG. 5 is a fragmentary top plan view showing a modified form of neck finish in accordance with this invention.

Thus with a neck finish of substantially uniform wall thickness, but unduly thinned, the four axial beams strengthening the neck finish against axial collapse may be obtained by interrupting the threads 44 generally at 90° positions as shown in FIG. 5. Although in the preferred embodiment of the invention as shown in FIGS. 1 and 2 the interruptions 32 are generally at 90° from the parting lines 28, and this does solve the problem, it is feasible to shift the position of thread interruptions away from the exactly 90° position, generally speaking, the further the thread interruptions are shifted from this position, the lesser the beam strength effecting this.

Figure 6:
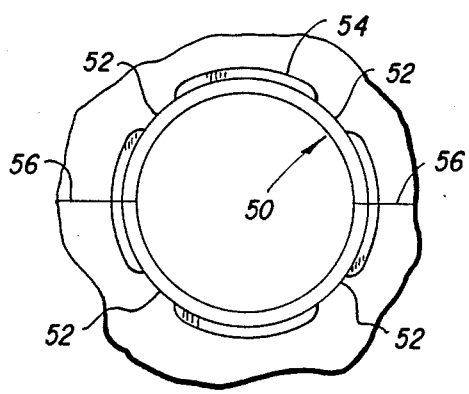
FIG. 6 is another top plan view of another modified form of neck finish in accordance with this invention.

On the other hand, as shown in FIG. 6, it is feasible to increase the number of axial beams. The neck finish 50 of FIG. 6 is provided with four thread interruptions at 52 of the threads 54 and thus provides for four axial beams due to thread interruption. In the illustrated embodiment of the invention, the thread interruptions are shown as being spaced 45° from parting lines 56. However, this occurs only when the thread segments are of the same length. It will be apparent that when the lengths of the segments of the threads 54 aligned with the parting lines 56 are increased and the lengths of the other segments of the threads 54 are decreased, the angle between the thread interruptions and the parting lines 56 will increase.

It is to be understood that the multiple thread interruptions of FIG. 6 may be beneficially utilized even when there is no axial beam strength in alignment with the parting lines 56. When the neck finish 50 is formed from a parison such as the parison 10 wherein there is maximum wall thickness in the parison in alignment with the parting lines 56, there may also be axial beam strength in alignment with the parting lines. In which event, the thread interruptions 52 may be spaced further from the parting lines 56 to provide the required axial beam strength remote from the parting lines 56.

Although only several preferred embodiments of neck finishes and thread interruptions in accordance with this invention have been specifically illustrated and described herein, it is to be understood that minor variations may be made in the arrangement of thread interruptions and neck finish wall thicknesses without departing from the spirit and scope of the invention as defined by the appended claims.

I claim:

1. A plastic container having a blow molded neck finish including a radially outwardly formed hollow thread which weakens said neck finish against axial collapse when axially loaded, said container having been blow molded in a split mold and having diametrically opposite parting lines, said container neck finish being axially strengthened by having said thread interrupted between and remote from said parting lines to provide axial beam strength in said neck finish remote from said parting lines.

2. A plastic container according to claim 1 wherein said neck finish is of a greater wall thickness along said parting lines than in other portions of said neck finish to provide further axial beam strength.

3. A plastic container according to claim 2 wherein said thread interruptions are equally spaced from said parting lines to equally distribute said beam strength circumferentially about said neck finish.

4. A plastic container according to claim 1 wherein said thread interruptions are equally spaced from said parting lines.

5. A plastic container according to claim 4 wherein there are plural thread interruptions between said parting lines on each side of said neck finish.

6. A plastic container according to claim 2 wherein said thread interruptions are generally 90° from said parting lines.

7. A plastic container according to claim 2 wherein said thread interruptions are generally 90° from said parting lines, said container being of a greatest transverse dimension between said parting lines, and said neck finish being circular and the thinnest generally 90° from said parting lines.

8. A plastic container according to claim 1 wherein said thread interruptions are generally 90° from said parting lines.

9. A plastic container according to claim 1 wherein said thread interruptions are generally 90° from said parting lines, said container being of a greatest transverse dimension between said parting lines, and said neck finish being circular and the thinnest generally 90° from said parting lines.

10. A plastic container according to claim 1 wherein said thread interruptions are generally 90° from said parting lines, and said container is formed from a circular tubular parison of circumferential varying wall thickness with said wall thickness being the greatest in alignment with said parting lines and the thinnest generally 90° from said parting lines.

* * * * *